(12) United States Patent
Kunz et al.

(10) Patent No.: US 11,536,881 B2
(45) Date of Patent: Dec. 27, 2022

(54) CONICAL MIRROR CONCENTRATOR FOR A LASER-COOLED COLD ATOM SOURCE

(71) Applicant: U.S. Army Combat Capabilities Development Command, Army Research Laboratory, Adelphi, MD (US)

(72) Inventors: Paul Kunz, Washington, DC (US); Fredrik Fatemi, McLean, VA (US); Kevin Cox, Laurel, MD (US); David Meyer, Burtonsville, MD (US)

(73) Assignee: The Unuted States of America, as represented by the Secretary of the Army, Washington, DC (US)

( * ) Notice: Subject to any disclaimer, the term of this patent is extended or adjusted under 35 U.S.C. 154(b) by 28 days.

(21) Appl. No.: 17/029,585

(22) Filed: Sep. 23, 2020

(65) Prior Publication Data

US 2022/0091312 A1 Mar. 24, 2022

(51) Int. Cl.
*G02B 5/10* (2006.01)
*H05H 3/02* (2006.01)
*B82Y 15/00* (2011.01)

(52) U.S. Cl.
CPC ............... *G02B 5/10* (2013.01); *H05H 3/02* (2013.01); *B82Y 15/00* (2013.01)

(58) Field of Classification Search
CPC .................................... G02B 5/10; H05H 3/02
USPC ........................................ 359/853, 868, 869
See application file for complete search history.

(56) References Cited

U.S. PATENT DOCUMENTS

| | | | | | |
|---|---|---|---|---|---|
| 3,656,845 | A | * | 4/1972 | Koch-Bossard | F41G 3/2694 353/42 |
| 3,981,705 | A | * | 9/1976 | Jaeger | B23K 26/0734 65/392 |
| 4,856,870 | A | * | 8/1989 | Berkers | H01S 3/02 359/823 |
| 4,935,774 | A | * | 6/1990 | Ageishi | G03F 7/20 355/104 |
| 5,543,972 | A | * | 8/1996 | Kamewada | E21B 47/002 359/834 |
| 5,572,563 | A | * | 11/1996 | Kasumi | G21K 1/06 378/34 |

(Continued)

OTHER PUBLICATIONS

J. A. Kim, et al., "Atom trap in an axicon mirror," Optics Letters, 117, vol. 22, No. 2 (Jan. 15, 1997).

(Continued)

*Primary Examiner* — Ricky D Shafer
(74) *Attorney, Agent, or Firm* — Eric B. Compton

(57) ABSTRACT

A conical mirror concentrator is disclosed which is configured for use as a laser-cooled cooled atom source. According to embodiments, the conical mirror concentrator may comprise a body; a reflective inner conical surface formed on the body tapering from a large diameter at a first side of body inward to a smaller dimeter in an interior space of the body, wherein the inner conical surface focuses light to an axis within the interior space of the body; a hole extending from the interior space of the body near a pinnacle of the inner conical surface to a second, opposite side of body; and a structure configured to mount the concentrator to an ultrahigh vacuum chamber, such as a CF (or Conflat) flange or an anodicly bonded glass plate.

24 Claims, 9 Drawing Sheets

(56) References Cited

U.S. PATENT DOCUMENTS

| | | | |
|---|---|---|---|
| 5,781,649 A * | 7/1998 | Brezoczky | G01N 21/94 356/603 |
| 6,303,928 B1 | 10/2001 | Buell et al. | |
| 9,134,450 B2 * | 9/2015 | Desruelle | G01V 7/14 |
| 2012/0275043 A1 * | 11/2012 | Sun | G02B 19/0052 359/868 |

OTHER PUBLICATIONS

H. H. Kim, et al., "Cold atomic beam produced by a conical mirror funnel," Phys. Rev A, vol. 64, 013402 (2001).

Physics Platform Laser Cooling Optics Product Data Sheet. ColdQuanta. Available at: https://www.coldquanta.com/standard_products/physics-platform/ (Note: "1/19" in bottom right corner, presumably a date).

"Anodic bonding" webpage. LNF WIKI University of Michigan. Available at: http://lnf-wiki.eecs.umich.edu/wiki/Anodic_bonding (webpage states: "This page was last edited on Apr. 23, 2020;" accessed Jul. 16, 2020).

"Bored Conflat Flange, CF 2 3/4 inch, Bored 1.50 in, Through Holes, Non-Rotatable, 2.75 inch CF-F, SS" webpage. Ideal Vacuum Products. Available at: https://www.idealvac.com/Bored-Conflat-Flange/pp/P104657 (Page footer states 2002-2018 Copyright; accessed Jul. 15, 2020).

"CF Flanges Technical Notes" webpage. Kurt J. Lesker Company. Available at: https://www.lesker.com/newweb/flanges/flanges_technicalnotes_conflat_1.cfm (accessed Jul. 15, 2020).

"Mark 3 Ion Extractor Cone" webpage. RTF Technologies. (Copyright © 1998-2005). Available at: http://www.rtftechnologies.org/physics/fusor-mark3-ecrf-extractor.htm.

* cited by examiner

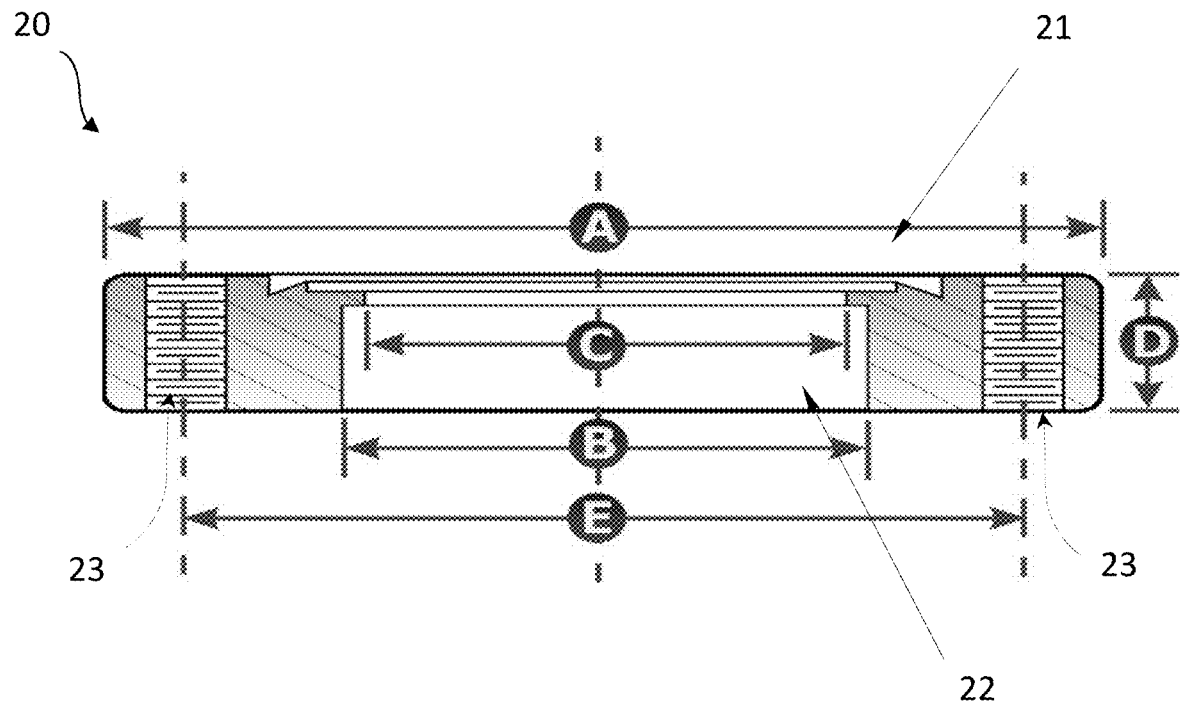
FIG. 2A (Conventional)

CONICAL MIRROR CONCENTRATOR FOR A LASER-COOLED COLD ATOM SOURCE

GOVERNMENT INTEREST

The invention described herein may be manufactured, used, and licensed by or for the United States Government.

BACKGROUND OF THE INVENTION

I. Field

The present invention relates generally to a light beam concentrator, and more particularly, to a conical mirror concentrator which is configured for use as a laser-cooled atom source operated in a vacuum environment.

II. Description of Related Art

Laser-cooled atom beam sources are used for a variety of scientific research applications, including quantum memories, quantum simulators, quantum repeaters, quantum computers, atomic clocks, atom interferometers, and magnetometers to name just a few. These sources are incorporated into a vacuum enclosure. A plurality of high-power lasers are focused to cool source material atoms. Each laser requires sensitive optics. One commercially-available laser-cooled atom beam source includes five separate lasers surrounding the source material. This requires added size and complexity to accommodate the many lasers. Moreover, considerable time is required to precisely align and adjust the many focal points of the lasers to impinge upon the same location. Improvements would be beneficial.

SUMMARY OF THE INVENTION

Novel conical mirror concentrators are disclosed which are configured for use as a laser-cooled cooled atom source.

According to embodiments, a conical mirror concentrator for a laser-cooled cold atom beam source comprises: a body; a reflective inner conical surface formed on the body tapering from a large diameter at a first side of body inward to a smaller dimeter in an interior space of the body, wherein the inner conical surface focuses light to an axis within the interior space of the body; a hole extending from the interior space of the body near the pinnacle of the inner conical surface to a second, opposite side of body; and a structure or means for mounting the concentrator to a vacuum chamber. The vacuum chamber may be an ultra-high vacuum chamber.

In some embodiments, the means for mounting the concentrator to the vacuum chamber can comprise a flange connected to the body. For instance, the flange can extend from the outer circumference of the body. Preferably, the flange has standardized dimensions corresponding to a CF (or Conflat) flange hardware, but this is not a strict requirement. More particularly, the flange may be configured to have a standardized dimension for vacuum gaskets for ultra-high vacuum applications. At least the flange may be formed of oxygen-free copper. More preferable, the body and flange are integrally formed together as a single piece, and thus are the same material. To enhance reflectivity, the inner conical surface is polished and/or coated to form a highly reflective surface.

In other embodiments, the means for mounting the concentrator to the vacuum chamber can comprise an anodicly bond glass plate. Such a bond is formed via anodic bonding, i.e., a process to seal glass to either silicon or some types of metal without introducing an intermediate layer. The body can be formed of silicon. The glass plate may preferably be transparent to light, such as where the glass plate closes off and seals the front of the conical mirror concentrator. The glass plate could also connect to a mounting structure, such as a CF mounting plate, in some arrangements.

The body of the concentrator can be further configured to include a sealed cavity for containing a pellet of source material, and a small passageway which connects the sealed cavity to the interior space of the body. The pellet of source material may be attached to a wire or conductor which passes through a plate sealing the pellet within the cavity and is configured to heat the pellet of source material and vaporize atoms thereof via resistive electrical heating. To enable resistive electrical heating and vaporization of the source material, a wire or conductor can be incorporated in the conical mirror concentrator and/or extends through the flange. The wire or conductor is configured to pass electricity sufficient to heat a pellet of source material attached to the wire or conductor and vaporize atoms thereof.

According to further embodiments, a laser-cooled cold atom beam source for producing cooled atoms in a laser cooled atom experimentation apparatus comprises: a vacuum chamber having a wall at least a portion of which is transparent to laser light; the aforementioned conical mirror concentrator positioned in or connected to the vacuum chamber; and a single laser, positioned outside of the vacuum chamber, for providing a beam of light to the conical mirror concentrator. Magnetic field coils may be arranged near the conical mirror concentrator.

And, according to other embodiments, a laser cooled cold atom experimentation apparatus comprises: the aforementioned laser cooled atom beam source producing cooled atoms; and a high-vacuum section configured to perform an experimentation using the cooled atoms.

In yet other embodiments, a method of replacing a laser cooled atom beam source in an existing laser cooled atom experimentation apparatus is provided. Such a method comprises: removing an existing laser cooled atom beam source comprised of multiple lasers for cooling source material from the existing laser cooled atom experimentation apparatus; and attaching the aforementioned laser cooled atom beam source to the laser cooled atom experimentation apparatus in its place.

These and other embodiments of the invention are described in more detail below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments, including less effective but also less expensive embodiments which for some applications may be preferred when funds are limited. These embodiments are intended to be included within the following description and protected by the accompanying claims.

FIG. 2A shows one conventional CF mounting plate for use with a CF gasket.

DETAILED DESCRIPTION

Figure 1A:
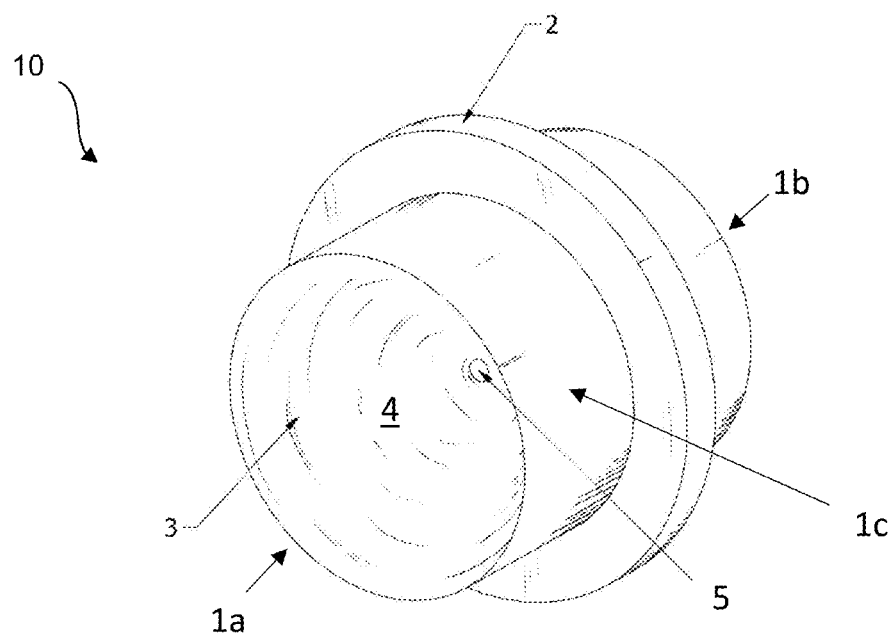
FIGS. 1A and 1B show an isometric view and side cross-sectional view, respectively, of a conical mirror concentrator for a laser-cooled cold atom experimentation apparatus, according to an embodiment.
Figure 1B:
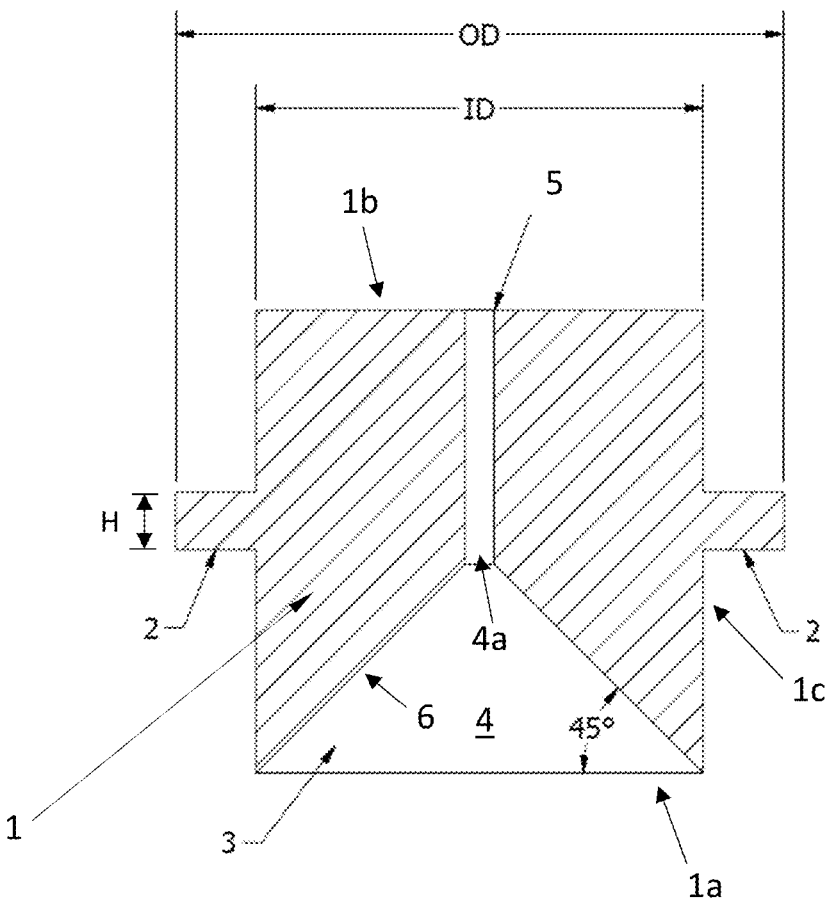

FIGS. 1A and 1B show an isometric view and side cross-sectional view, respectively, of a conical mirror concentrator 10 for a laser-cooled cold atom experimentation apparatus, according to an embodiment. The conical mirror concentrator 10 is comprised of a main body portion (or body) 1, a flange 2, an inner conical surface 3, a conical interior space 4 of the body 1 defined by the inner conical surface, and a though hole 5 connecting the interior space 4 of the body 1 to exterior of the body 1 on the opposite side.

The body 1 may be generally cylindrical in shape and configuration having a front side 1a, a rear side 1b and a cylindrical side 1c. A flange 2 extends radially around the cylindrical side 1c of the body 1. As depicted, the conical mirror concentrator 10 has an outer diameter (OD), inner diameter (ID) and initial flange thickness (H). The width of the flange 2, as measured extending radially from the side 1c of the body 1 outward, thus may be OD−ID/2.

A cone is formed in the interior of the concentrator 10. The inner conical surface 3 tapers, from its largest diameter at cone's aperture at the front side 1a of the body 1 to a pinnacle 4a within interior of the body 1, at an angle. This forms the conical interior space 4 within the body 1. In one non-limiting example, the conical interior space 4 is 2.5 cm in diameter at the front side 1a of the body 1 and 1.25 cm deep measured from the front side 1a of the body 1 to the pinnacle 4a; this forms a 90° cone with the inner conical surface 3 tapering at a 45° angle measured from the cone's aperture at the front side 1a of the body). Other sizes and angles of the conical interior space 4 are certainly possible.

The interior conical configuration is designed to reflect and focus light from a coherent beam of light entering substantially normal from the front surface 1a of a body (and substantially parallel to the central axis of the cone) to focal points along the cone axis of the conical interior space 4. The axial locations of reflection from points along the surface 3 to the cone axis depend on the cone size and angle. For a 90° cone, in particular, the length of the focal line is equal to the cone radius at a point on the interior surface and will be located within the cone between its aperture and pinnacle.

The through hole 5 extends from near the pinnacle 4a of the conical interior space 4 to the rear side 1b of the body 1. It is designed to pass cold atoms from a source material area/cell located at the front side 1a to chamber located at the rear side 1c, as discussed below. The length and diameter of the through hole 5 can be chosen appropriately for end user needs. For instance, the through hole 5 may have a length and diameter of 1 mm and 0.3 mm, respectively, in one non-limiting example. It is noted that there may be a tradeoff and compromise between higher cold atom flux and higher background pressure or vice versa.

This conical mirror concentrator 10 integrates a conical mirror and a mounting flange 2 in an integrated way. The conical mirror concentrator 10 may be formed, for instance, by machining, casting, forging, and/or additive manufacturing (AM) as a few non-limiting examples. In some instances, the conical mirror concentrator 10 is preferably formed as a single piece of material that is compatible with ultra-high vacuum. The concentrator 10 can be shaped into a cylindrical shape and the conical interior space 4 formed with a lathe, for instance, if machining is used. The through-hole 5 may be formed by drilling or boring, in some cases. The piece formed, when combined with appropriate magnetic fields and laser wavelengths, serves as a simple and power-efficient way to create a cold beam of atoms well-suited to load an atom trap.

In some embodiments, the conical mirror concentrator 10 may be fabricated from oxygen free copper (OFC). OFC is generally defined as consisting of 99.95-99.99 at. wt. % copper with less than or equal to 0.0005 at. wt. % oxygen. Of course, other materials that can be used to simultaneously provide a robust ultra-high vacuum gasket seal with a standard CF flange (i.e., stainless steel knife edge), ultra-high vacuum-compatible low outgassing rate, and a reflective conical mirror surface.

Once formed, the inner conical surface 3 can be polished or can easily be coated with reflective coating 6. For instance, the inner conical surface 3 may be polished to form a highly reflective or mirror-like surface in some embodiments. The degree of polishing of the conical surface is not a stringent metric. As long as the surface 3 behaves as a mirror to the light beam LB, thus a surface roughness less than $\frac{1}{3}$-$\frac{1}{5}$ of the wavelength of laser light, operation should be successful. A surface that is too smooth or polished could potentially be more detrimental as unexpected polarization and interference effects might cause problems. We suspect this could occur with a polish approaching $\frac{1}{100}$ of the wavelength of laser light; in other words, typically approaching a surface roughness of 10 nm or less.

In others, a highly reflective coating 6 may be formed on the inner conical surface 3. The coating 6 may be silver, gold, or other material as may be required for high optical reflectivity at the relevant wavelength. The coating 6 may be applied by spraying, solution precipitation, physical vapor deposition, or electrodeposition, as non-limiting examples. In some cases, the coating 6 applied may provide sufficient reflection. Once the coating 6 is applied, it may be further polished if needed to provide greater reflection.

The flange 2 of the conical mirror concentrator 10 may be configured to mimic a washer ring used with a conventional CF (also known as ConFlat in the art) flange assembly. CF or Conflat assemblies are commonly used for coupling connectors in high pressure or vacuum environments. CF hardware comes in standard sizes corresponding to the coupling connectors. It may be convenient and cost effective to use standard off-the-shelf vacuum hardware components for some embodiments. However, it should be appreciated that the concentrator's configuration is not limited to these dimensions, and could be made much more compact if custom vacuum hardware is used.

FIG. 2A shows one conventional CF mounting plate 20 for use with a CF gasket. Table I, below, shows the standard dimensions A-E for the conventional CF Flange mounting plate 20 having an OD of 2¾ inches.

TABLE I

Standard Dimensions for a CF Flange, OD = 2¾ in.

| Dimension | Size (in) | Size (mm) |
|---|---|---|
| A | 2¾ | 69.30 |
| B | 1½ | 38.35 |
| C | 1⁷⁄₁₆ | 36.60 |
| D | ⁹⁄₁₆ | 12.70 |
| E | 2⁵⁄₁₆ | 58.72 |

The flange 2 of the conical mirror concentrator 10 may be configured to be complementary so as to have an OD of 2¾ inches or about 70 mm, and an ID bore diameter of roughly 35 mm. The thickness H of the flange 2 may be approximately 12.7 mm.

Figure 3:
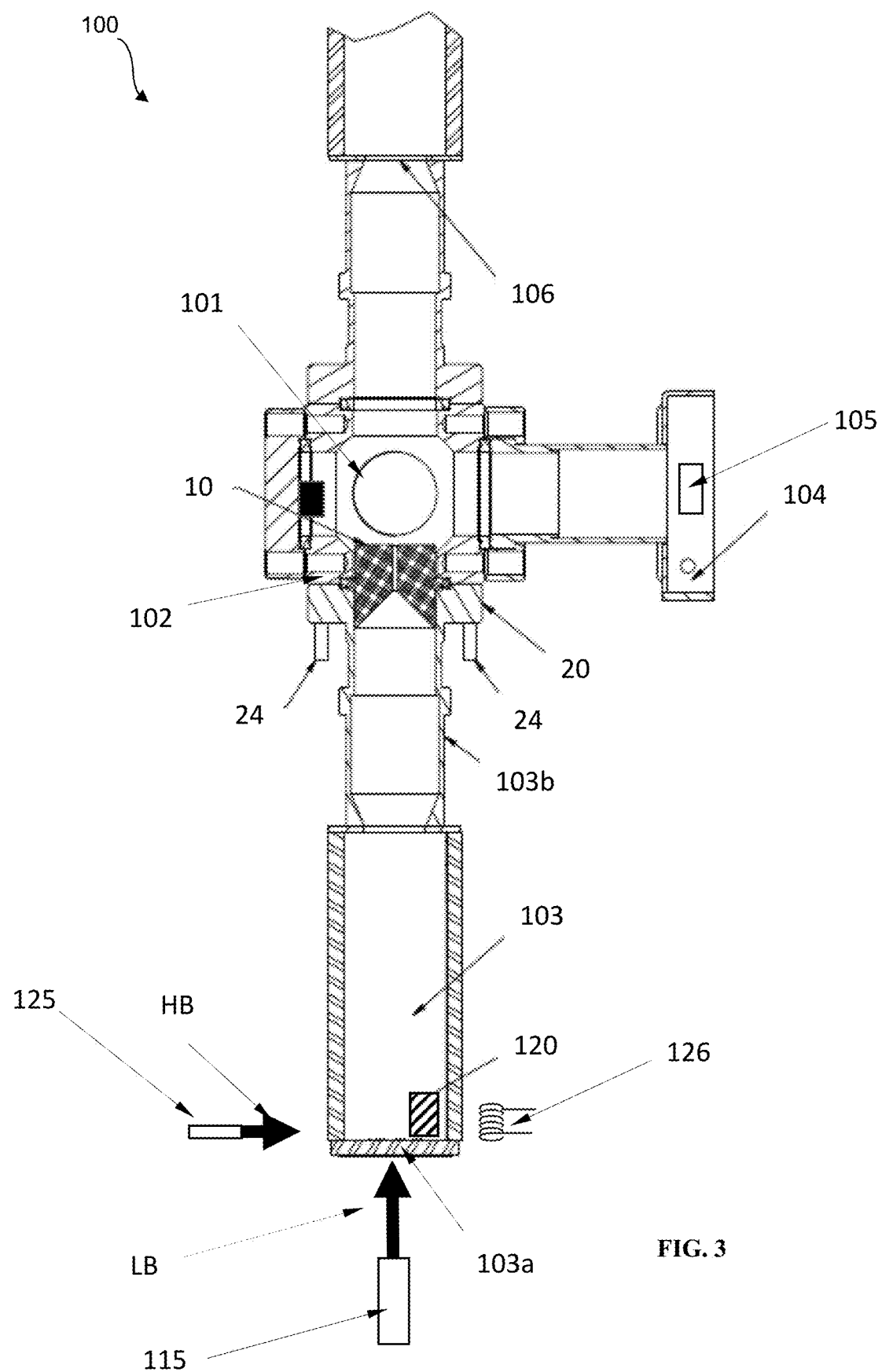
FIG. 3 is a side cross-sectional view of a laser-cooled cold atom experimentation apparatus according to an embodiment.

The flange 2 of the concentrator 10 can be sandwiched between the CF mounting plate 20 and another mounting structure (e.g., a mounting location 102 located on the central mounting structure 101 of a laser cooled cold atom experimentation apparatus 100 as further shown in FIG. 3). They provide compressive force between the top and bottom of the flange 2. The top surface 21 of the CF mounting plate 20 receives the flange 2. It has a non-flat surface profile for pinching and deforming the flange 20. A central opening 22 in the plate 20 can accommodate the body 1 of the conical mirror concentrator 10 and allow light to pass. Threaded bore holes 23 accommodate mounting fasteners, such as screws or bolts 24, as further depicted in FIG. 3.

The mounting structure on the apparatus (e.g., the mounting location 102 of the central mounting structure 101 in FIG. 3) has a similar non-flat surface profile as the top surface 21 of the mounting plate 20. Typically, the mounting structure surrounds an aperture or other opening into the interior of the apparatus which is maintained in ultra-high vacuum. In addition to being a mounting means, the flange 2 is configured to provide a proper seal between the interior of the apparatus which is in ultra-high vacuum and the exterior which is at ambient pressure.

Figure 2B:
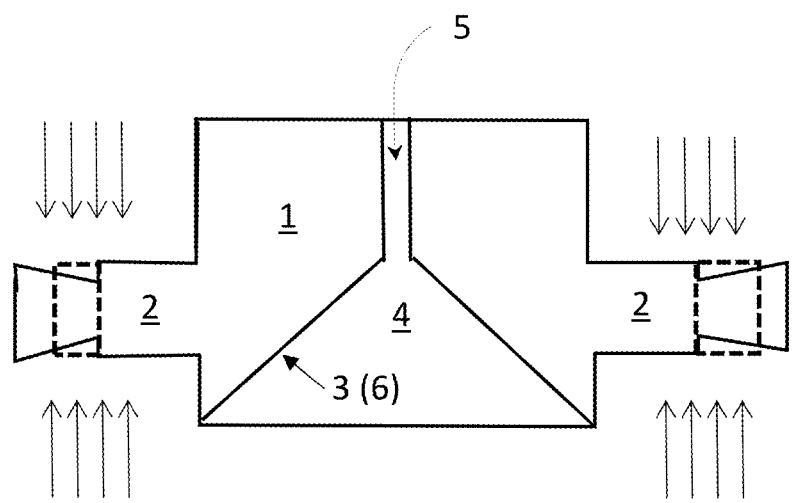
FIG. 2B is a schematic diagram showing the conical mirror concentrator according to an embodiments with its flange compressed.

FIG. 2B is a schematic showing the conical mirror concentrator 10 with the flange 2 compressed. The flange 2 initially has a rectangular or prism shape shown in the dotted outline before it is compressed and pinched. The compressive pressure is depicted as the series of vertical arrows above and below the flange 2. It is generated by sandwiching the flange 2 between two components, such as the CF mounting plate 20 and a mounting structure at location 102 connected by mounting fasteners 24, and tightening the mounting fasteners. Continued tightening of the mounting fasteners 24 generates more compressive pressure on the flange 2. With sufficient tightening of the fasteners 24, the flange 2 deforms similar to a conventional CF flange gasket. It constricts into a wedge shape at its top and bottom. This pinching forms an ultra-high vacuum seal. In some instances, it may elongate radially to accommodate deformation at the top and bottom. The remaining features of the conical mirror concentrator 10, i.e., the body 1, the inner conical surface 3 (and any reflective coating 6), the conical interior 4, and through hole 5, are left unaffected by the pinching. Their dimensions should not change.

FIG. 3 shows a side cross-sectional view of a laser-cooled cold atom experimentation apparatus 100 according to an embodiment. The apparatus 100 can be used in a plethora of cold atom based research applications, including quantum memories, quantum simulators, quantum repeaters, quantum computers, atomic clocks, atom interferometers, and magnetometers to name a few. The interior of the apparatus 100 may be operated in ultra-high vacuum such as at a pressure of $10^{-7}$ Torr or less.

The apparatus 100 is comprised of a central mounting structure 101, a source cell 103, pumping chamber 104, and an experimentation (or "science") cell 106. The central mounting structure 101 may be formed on a spherical cube 10 vacuum chamber in some embodiments. This is a standard commercial part. It may be formed of stainless steel. Of course, other housings and/or other structure may be used for the central mounting structure 101 which are suitable for forming a vacuum enclosure.

The source cell 103 is used for vaporizing and producing cold atoms. It uses a single high-power laser 115 to generate a light beam LB output. The light beam LB could be in the UV, visible and/or IR spectra. It may have a wavelength of 780 nanometers as a non-limiting example. The high-power laser 115 may be positioned at the bottom of the source cell 103. The bottom wall 103a of the source cell 103 can sufficiently transparent such that the light beam LB passes through it and to the conical mirror concentrator 10. (Note: while it might appear that the light beam LB impinges upon the source block/pellet 120 of source material, the light beam LB and the source material 120 would be spaced apart from one another). The conical mirror concentrator 10 concentrates the light beam LB to chill the source material atoms. This is further shown and described in more detail below with respect to FIG. 3A.

The front side 1a of the conical mirror concentrator 10 faces the laser beam LB. The conical mirror concentrator 10 integrates the concentrator optics with the mounting flange 2, making the whole system more compact, robust, less sensitive to vibrations. It eliminates the need for bulky and sensitive optics required to create a standard 2D-Magneto Optical Trap (MOT) cold atom source. Again, this make the whole system much more compact, not just the vacuum system by integrating the body 1 and the flange 2 of the conical mirror 10, but also by eliminating many optical elements that are necessary for a traditional laser-cooled beam source. It also make more efficient use of the laser power because of single beam for cooling.

Laser cooling and magneto-optical trapping are principally forms of Doppler cooling, and that is the mechanism of the present cold atom source. The atoms mostly absorb laser photons from the laser beam that they are moving towards. Since they re-emit (i.e. scatter) this light to all directions, the moment kick from each scattering event results in a reduction of atom's momentum in the original direction of travel. This loss of kinetic energy translates into cooling, with the entropy being carried away by the scattered light. The source cell 103 cools the atoms in the two transverse dimensions to approximately the atom's Doppler limit, and in the third dimension the atoms remain relatively hot (e.g., velocities of order $10^2$ m/s with Boltzmann distribution).

It is desirable to have a large light beam LB, up to the diameter of the inner conical surface 3 the conical mirror concentrator 10, and the laser power should be sufficient to achieve approximately two saturation parameters. For typical alkali atoms, this means intensities of at least 5 mW/cm$^2$. The wavelength should be red-detuned from atomic cycling transition resonance by approximately two natural linewidths. Repump light, i.e., to pump atoms out of the dark hyperfine state, should also be present. The incoming laser light is circularly polarized in accordance with the magnetic fields.

The original source of atomic vapor will typically come in the form of a block or pellet 120 of source material, that when heated ejects the atom of interest into the vacuum. For example, alkali vapors such as rubidium or cesium, which have historically been the most common, often come in the form of solid salts, such as those sold commercially as getter sources. These are then heated electrically or optically to eject the alkali atoms into vapor form. However, other materials can be used as desired. In some embodiments, the block or pellet 120 of source material may be heated with an auxiliary laser 125 which produces a heating beam of light HB and/or a heating element 126, such as an electric heater, which produces heat (the wavelength of this light is not critical; however, it should be appreciated that the higher the power the faster it heats the sample, generally 100 mW or higher is preferable). Both heating means may be located outside of source cell 103 provided its wall is transparent to the heating light beam HB of the auxiliary laser 125 to pass, and/or its surface is conductive for thermal heat generated from the heating element 126 to pass, to the solid block/pellet 120 of source material. Resistive electric heating could also be used as further explained with respect to subsequent embodiments.

Alternatively, higher purity forms of alkali metals can also be purchased commercially; these typically come in a glass ampoule that is broken under vacuum. The alkali metal is then vaporized at a slow rate by an electrical heater. The operation principle of this conical cold atom source is believed to work for all manner of laser-coolable atoms, and the species on that list continue to grow.

Atoms produced in the source cell 103 pass through the hole 5 in the conical mirror concentrator 10 into a central mounting structure 101 and ultimately to the experimentation cell 106. The experimentation cell 106 receives the cold atoms, where they can be used for conducting experiments. Various experiments can be carried out in the experimentation cell 106, in such areas as quantum sensors of electromagnetic fields, to atomic clocks, to inertial sensors, to quantum simulators and quantum computation. Thus, the experimentation cell 106 may include scientific or probing equipment as typically used for these type of experiments. Nearly all manner of light-matter (atomic or molecular vapor) interactions can be studied at a fundamental level with this type of apparatus, and many types of atom-atom or molecule-molecule interactions (i.e. cold or quantum chemistry) could be adapted for this apparatus.

Within the pumping chamber 104, there is a pump 105 which is configured to pull and maintain an ultra-high vacuum. The pump 105 may be an ion pump as one non-limiting example. The vacuum pressure in the source cell 103 may vary from what is in the experimentation cell 106. For instance, the source cell 103 can be initially evacuated to a pressure of approximately below 10$^{-7}$ Torr, with a higher partial pressure of the desired atomic species. The experimentation cell 106 into which the source is feeding the cold atoms may be kept at a lower background pressure (typically 10$^{-9}$ Torr or lower), and this differential pumping is achieved via continual operation of a vacuum ion pump on the lower pressure side of the small through hole 5 that the a beam of cold atoms travel through. There may be a trade-off between cold atom flux and pressure differential that can be chosen to suit desired needs; a larger hole means larger atom flux but small pressure differential (i.e. higher background pressure in the experimentation/science cell). The size of the ion pump is determined by the volume of the cells. For instance, a 2 liter/second ion pump 105 may be sufficient for many uses.

Figure 3A:
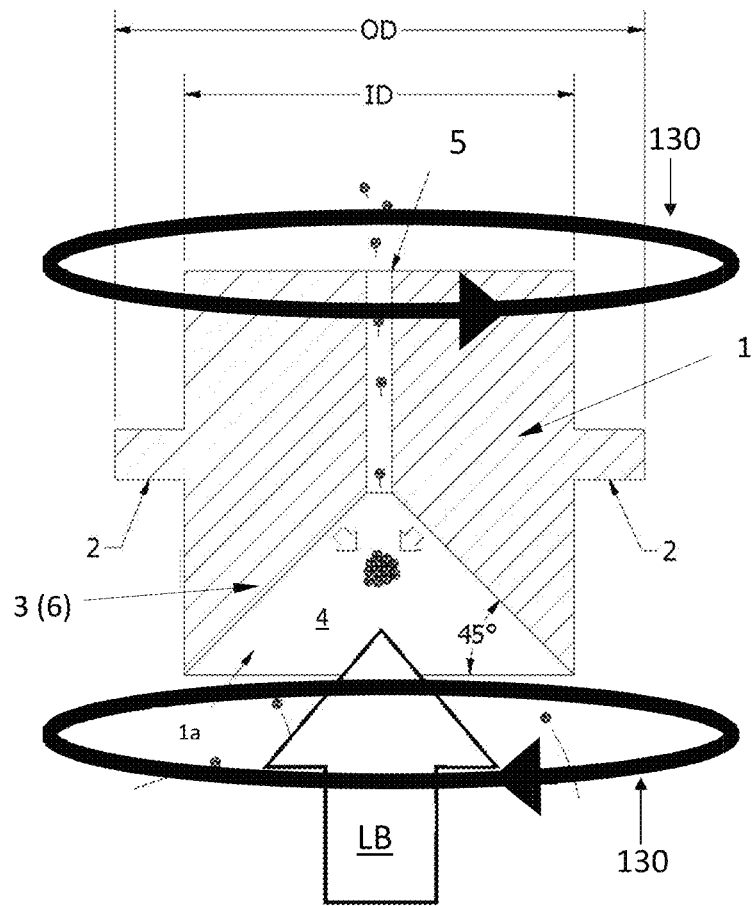
FIG. 3A shows a more detailed view of the operation of the conical mirror concentrator in a laser-cooled cold atom experimentation apparatus according to one embodiment.

FIG. 3A shows a more detailed view of the operation of the conical mirror concentrator 10 in a laser-cooled cold atom experimentation apparatus 100 according to one embodiment. In this figure, the large arrow represents incoming light beam LB, the smaller hollow arrows represent reflected light beam LB impinging upon atom cloud, and the tiny circles represent atoms (or very small atom clusters). The laser cools the atoms in the cloud and a beam of cold atoms flies through the transfer hole 5 to the experimentation cell 106.

The conical mirror concentrator 10 is positioned at the top 103$b$ of the source cell 103 as shown in FIG. 3. The heated, vaporized source material atoms (or small atom clusters) diffuse throughout the source cell 103 and ultimately upwards through the top 103$b$ of the call 103 and pass into the interior 4 of the conical mirror concentrator 10. The light beam LB output from the single high-power laser 115 enters substantially normal to the front side 1$a$ of the conical mirror concentrator 10. The inner conical surface 3 (or the reflective coating 6) reflect and concentrate the light beam LB. For a cone, with light normally entering the cone's aperture, the reflectance focuses upon the central axis of the cone.

As stated above, laser cooling and magneto-optical trapping are principally forms of Doppler cooling, and that is the mechanism of the present cold atom source. Magnetic field coils (as known as anti-Helmholtz coils) 130 are provided; the large arrows indicate the direction of electrical current flow. They may be located on the central mounting structure 101 and positioned to be close to the conical mirror concentrator 10. The atoms mostly absorb laser photons from the laser beam LB that they are moving towards. Since they re-emit (i.e. scatter) this light to all directions, the moment kick from each scattering event results in a reduction of atom's momentum in the original direction of travel. This loss of kinetic energy translates into cooling, with the entropy being carried away by the scattered light. The source cell 103 cools the atoms in the two transverse dimensions to approximately the atom's Doppler limit, and in the third dimension the atoms remain relatively hot (e.g., velocities of order 10$^2$ m/s with Boltzmann distribution).

The required magnetic fields used may be created by pairs of anti-Helmholtz coils 130, where the strength of the magnetic field gradient is determined by the electrical current driven through the coils and the number of loops in the coils. In turn, the value of these parameters (current and number of loops) are determined by the size and location of the coils, and the atomic species of interest. For example, using rubidium as the source material and placing the coils 130 roughly as shown in the figure, such that the coil diameter is roughly 10 cm, the appropriate magnetic field gradient of approximately 10 Gauss/cm can be achieved with between 10-20 loops in each coil and less than 5 Amps of current. The temperature of the cooled atoms may be as low as about 150 micro-Kelvin (i.e., 150×10$^{-6}$ K).

The cold atoms passes essentially as a beam via the through hole 5 in an upward manner. Ultimately, they will continue on to the experimentation cell 106.

Figure 4:
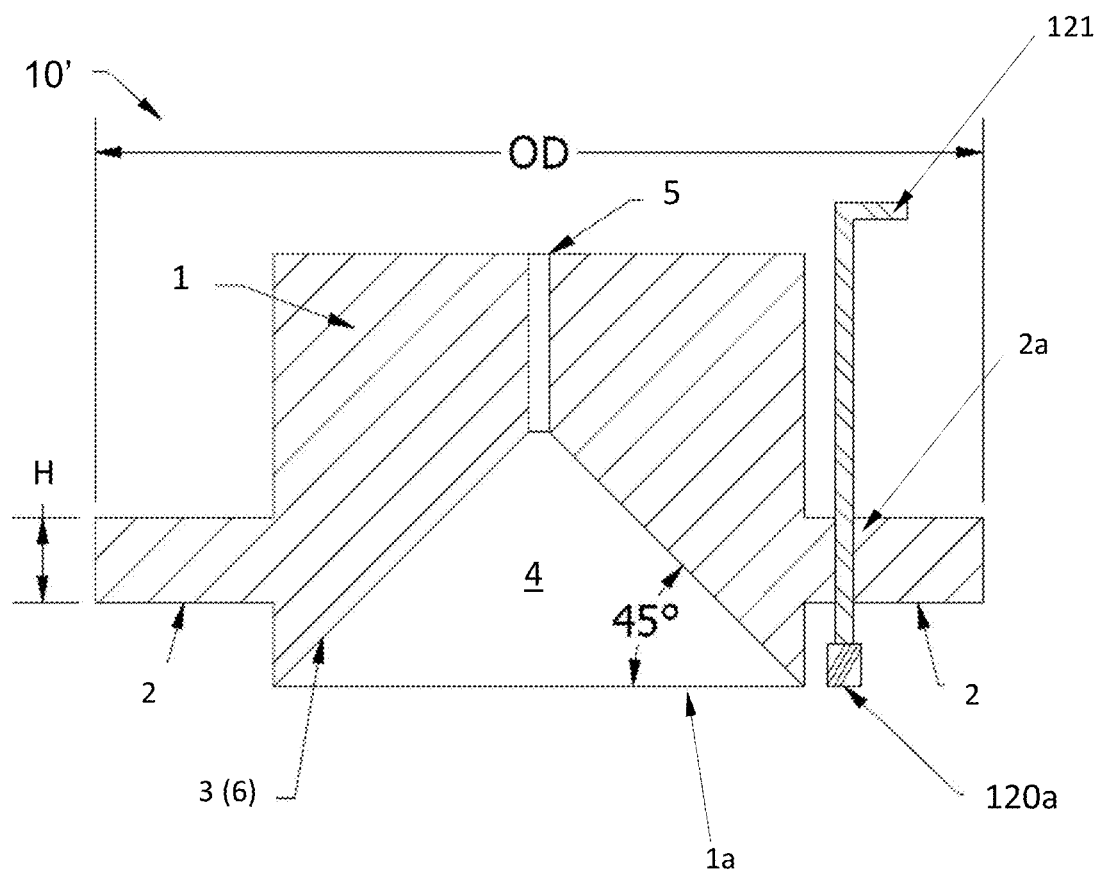
FIG. 4 shows another embodiment of the conical mirror concentrator in which a small pellet of source material is attached to it.

FIG. 4 shows another embodiment of the conical mirror concentrator 10' in which a small pellet 120*a* of source material is attached to it. This greatly simplifies the source cell 103 as will be later shown with respect to FIG. 5.

Pellet 120*a* is the source of atoms. It may be a solid block of material. Alkali metals (e.g., lithium, sodium, potassium, rubidium, cesium, and francium) may be used for some experiments. For instance, the pellet 120*a* may be 1 gram of rubidium salt in one non-limited example. This amount of source material may be sufficient for multiple years of use. However, various other sources materials can be used as desired.

The pellet 120*a* is attached to a wire or conductor 121 that passes through a passageway 2*a* of the flange 2. The attachment may be through brazing or solder, for instance. The wire or conductor 121 may be integrally formed in the passageway 2*a* so as to maintain a hermetic vacuum seal between the two sides of flange 2.

Resistive electrical heating may be used to heat the material of the pellet 120*a* to spew off the desired atomic vapor. Electrical current is passed via the wire or conductor 121 to the pellet 120*a*. This is commonly around 5V potential and 0.5 A of current, or 2.5 W, as an example. As atoms of the source material from the pellet 120*a* vaporize, they can drift toward the front side 1*a* of the body and enter the interior 4. The remaining features of the conical mirror concentrator 10' may be similar to the concentrator 10 shown in FIGS. 1A and 1B.

Figure 5:
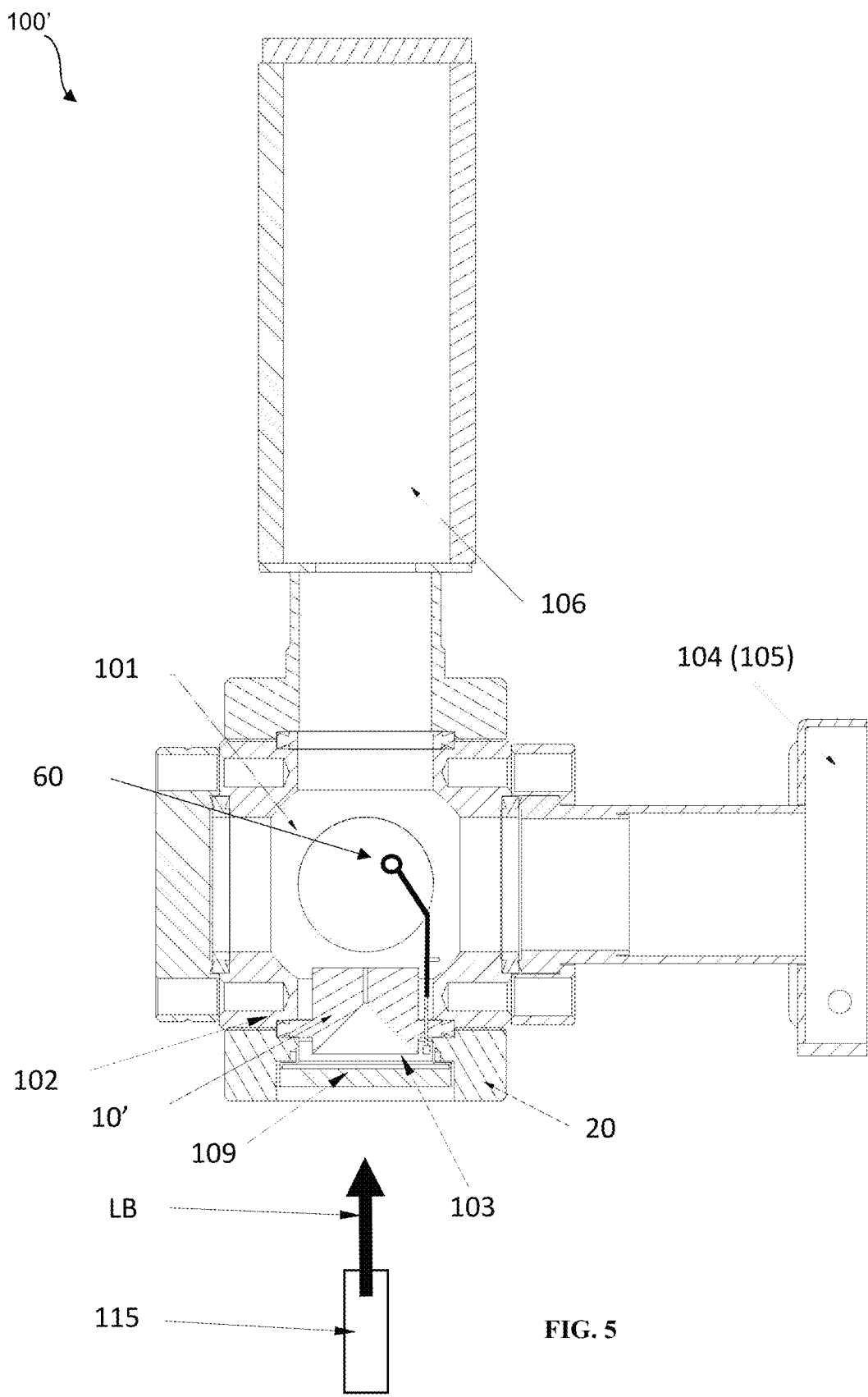
FIG. 5 is a side cross-sectional view of a laser-cooled cold atom experimentation apparatus according to another embodiment which incorporates the conical mirror concentrator.

FIG. 5 is a side cross-sectional view of a laser-cooled cold atom experimentation apparatus 100' according to an embodiment which incorporates the conical mirror concentrator 10'. The volume and complexity of the source cell 103 is greatly reduced compared to the apparatus 100 depicted in FIG. 3. Again, it uses a single high-power laser 115 to generate a light beam LB output. The laser 115 may be positioned at the bottom of the source cell 103. The light beam LB enters a transparent window 109 and continues to the conical mirror concentrator 10.

The transparent window 109 joins to a central mounting structure 101 of the laser-cooled cold atom experimentation apparatus 100' with ordinary fastening compatible for vacuum sealed elements. The pellet 120*a* is heated with resistive electrical current connected at point 60 to vaporize the source material. As such, there is no need for the auxiliary laser 125 and/or the heating element 126 shown in the apparatus 100 depicted in FIG. 3. Otherwise, the remaining elements and operation of apparatus 100' are similar to the apparatus 100 discussed above with respect to FIGS. 3 and 3A.

By using the cold atom source cell 103 depicted in FIG. 5, the volume can be reduced by a factor of 125 compared to an existing source cell system, for example, from 25 cm×25 cm×25 cm to 5 cm×5 cm×5 cm. In some embodiments, the cold atom source cell 103 could be integrated into a chip-based platform, i.e. fabricated in a silicon wafer. Compared to the existing system which used five laser beams, the a laser-cooled cold atom experimentation apparatus 100 according to embodiments of the present invention eliminates four high-power lasers along with their associated optics. This reduces the price and complexity, renders the system less fragile, and makes it more compact. Each laser and its associated optics can consume approximately 85 Watts of energy. This leads to a dramatic reduction in power for the eliminated lasers.

Figure 6:
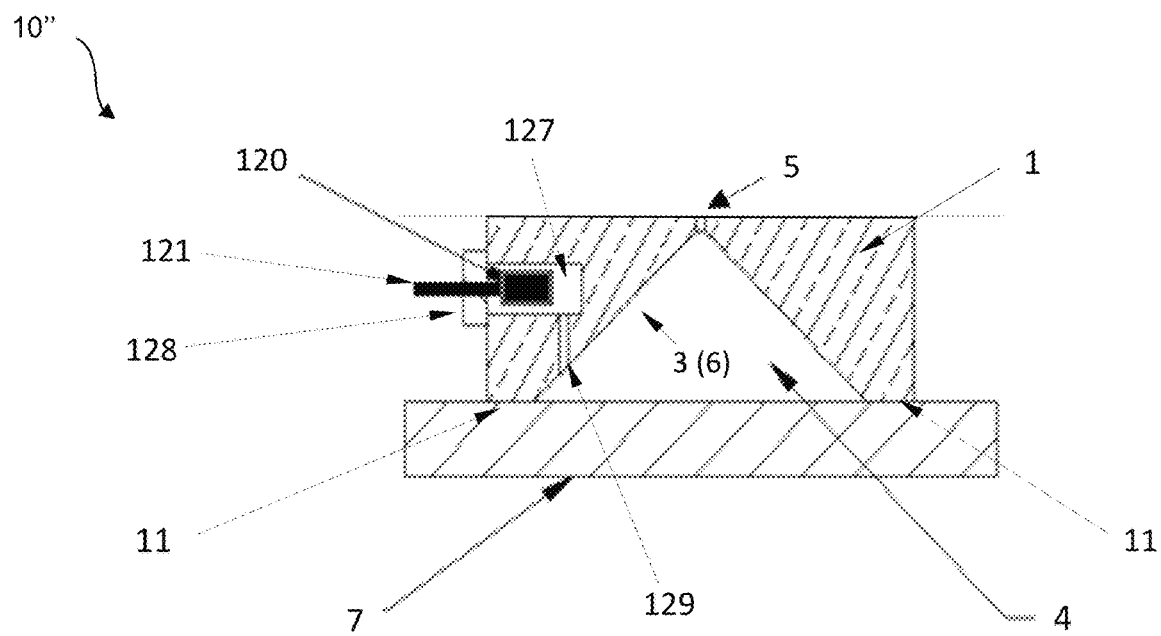
FIG. 6 is a side cross-sectional view of another embodiment of a conical mirror concentrator for use as a cold atom source.

FIG. 6 is a side cross-sectional view of another embodiment of a conical mirror concentrator 10" for use as a cold atom source. In this embodiment, the mounting flange 2 shown in the earlier figures for the concentrators 10 and 10' is eliminated. Instead, a plate 7 is bonded to the front side of the concentrator 10" so as to maintain a vacuum seal. The plate may be formed of glass. It closes off and seals the front of the conical mirror concentrator, but is transparent to light beam LB of the single high-powered laser 115.

The conical mirror concentrator 10" may be joined to the glass plate 7 via a bonding method, such as anodic bonding, which can form a hermetic vacuum seal. This makes the interior 4 of completely sealed except for the opening provided by the through hole 5. The inner conical surface 3 can be polished or may be coated with a highly reflective coating 6, like silver or gold, as described in earlier embodiments.

Anodic bonding is a bonding process to seal glass to either silicon or some types of metal without introducing an intermediate layer; it is commonly used to seal glass to silicon wafers in electronics and microfluidics. An anodic bond is considered a permanent bond.

Sufficient surface area at the front surface of the concentrator 10" should be provided for anodic bonding. To facilitate anodic bonding, in non-limiting embodiments, the glass plate 7 may be formed of Pyrex 7740, the body 1 of the concentrator 10" may be formed of a material that easily forms an oxide, such as silicon or a metal.

For the anodic bonding, the plate 7 and the body 1 are polished and cleaned and brought into contact with each other. This stack is raised to a temperature between about 180-450° C. and a DC voltage of 500-1000 V is applied across the stack with the glass being negative. The electric field causes the mobile ions to migrate towards the glass negative contact. This leaves oxygen at the silicon-glass interface. The strong electrostatic fields bring the wafers into intimate contact thus allowing minimal force to be used to keep them together. The silicon and oxygen atoms bond and form a very strong $SiO_2$ interface as depicted at points 11. It is noted that points 11 are actually a continuous circle which form a hermetic vacuum seal. The two substrates are permanently bonded together because the $SiO_2$ bond is stronger than the Si—Si bond or the glass.

Figure 7:
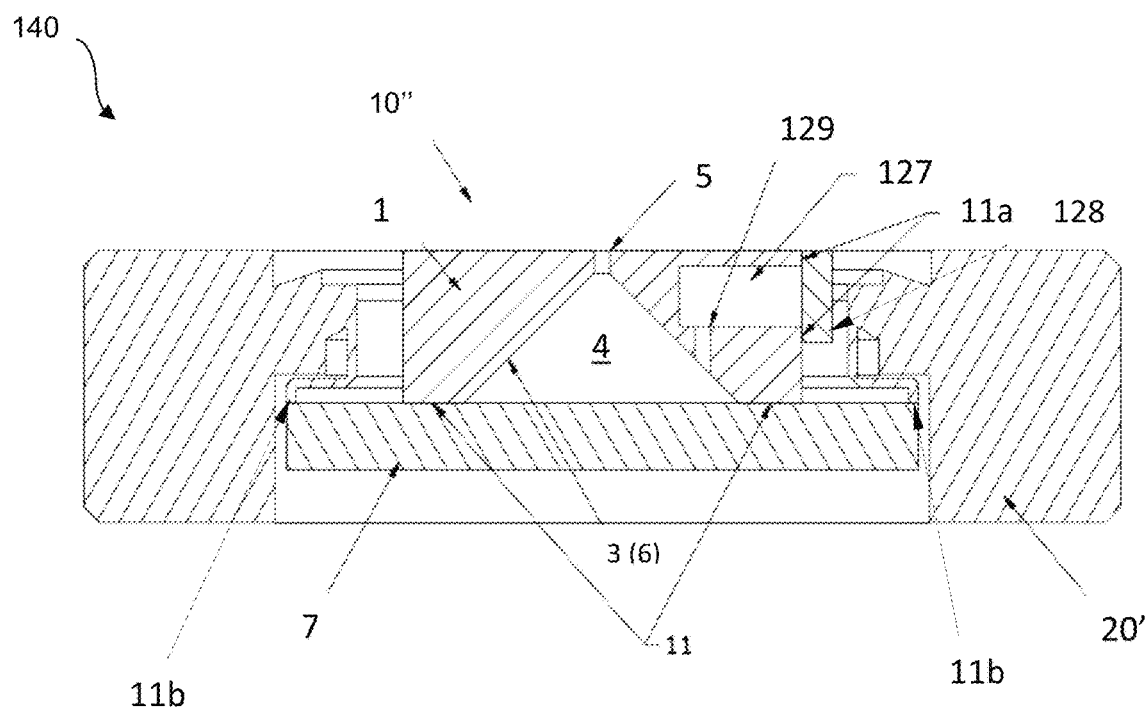
FIG. 7 shows a conical mirror concentrator connected to a CF flange gasket according to an embodiment.

As also shown, in the body 1 of the concentrator 10", there is a cavity 127 in which a source pellet 120*a* is placed. (Note: FIG. 7 shows the cavity 127 without the pellet 120*a*). Connected to the source pellet 120 is a wire or conductor 121 for resistive electrical heating. A plate 128 seals the source pellet 120*a* within the cavity 127.

The wire or conductor 121 can extend through the plate 128 similar to passageway 2*a* in the flange 2 in the earlier concentrator 10' embodiment. Thus the cavity 127 is completely sealed except for the small passageway 129. Electrical current is passed via the wire or conductor 121 to the pellet 120*a* which resistively heats the material of the pellet 120*a* to spew off the desired atomic vapor. Of course, other heating means (such as an auxiliary laser or heater) could be used as in prior embodiments and the plate 128 may be transparent and/or thermally conductive. A small passageway 129 connects the cavity 127 to the interior 4 allowing vaporized atoms of source material to pass. The cavity 127 and passageway 129 can be etched out of or drilled into the silicon body 1.

The plate 128 may be joined to the body via anionic bonding too at points 11*a*. It is noted that points 11*a* are actually a continuous circle which forms a vacuum seal. Although the anodic bonding of the plate 128 permanently closes and seals the cavity 127 from the outside, the source pellet 120a may provide source material for a long time. For instance, a 1 gram source pellet 120a may be sufficient for multiple years of use. When depleted of source material, the conical mirror concentrator 10" may be discarded or recycled.

FIG. 7 shows the conical mirror concentrator 10" connected to a CF flange gasket 20' according to an embodiment. The plate 7 can be further joined to the CF flange gasket 20', for instance, through anodic bonding at points 11b. Points 11b are actually a continuous circle which form a vacuum seal. This forms a sub-assembly 140 that can then be joined to a central mounting structure 101 of the laser-cooled cold atom experimentation apparatus 100 or 100' with ordinary fastening elements, like bolts, compatible for vacuum sealed environments.

Figure 8:
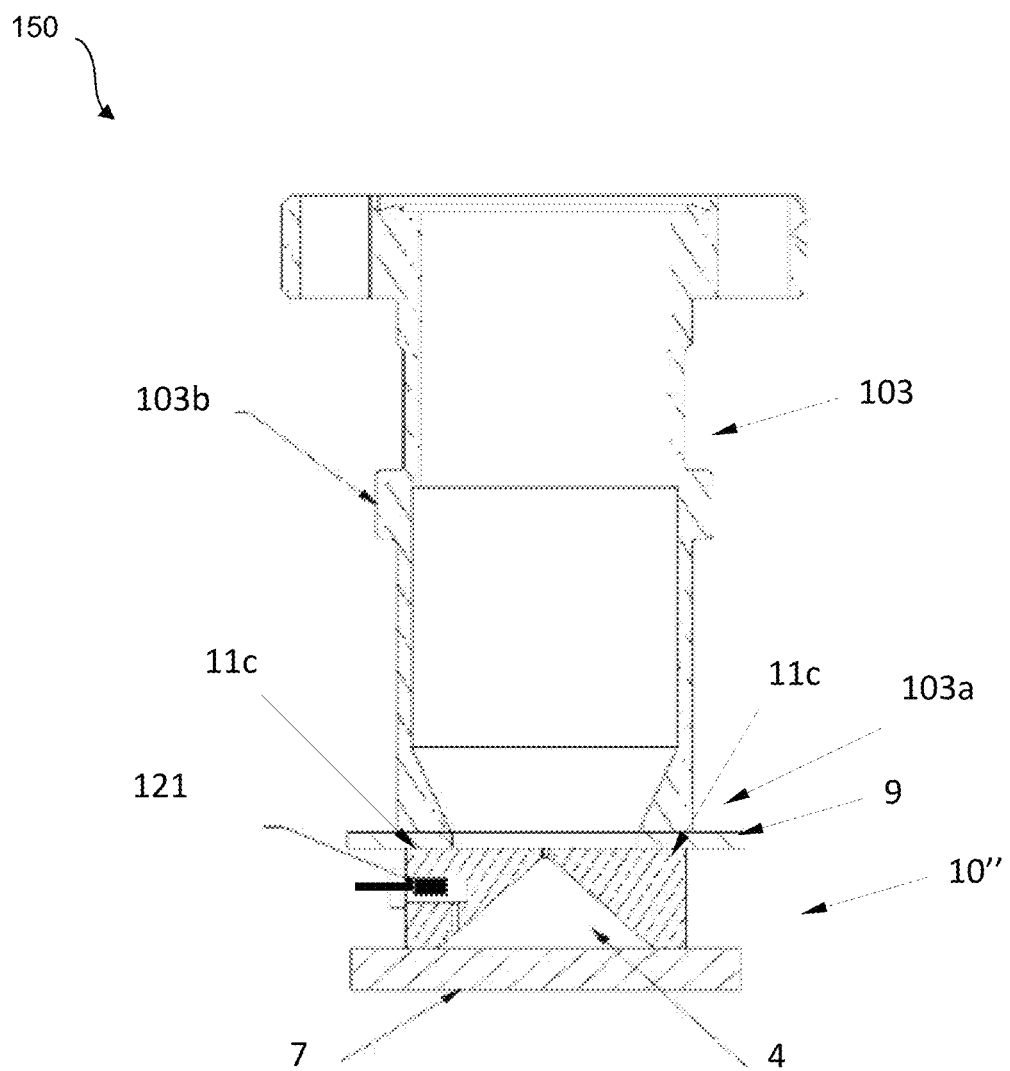
FIG. 8 shows the conical mirror concentrator bonded to a source cell to form a sub-assembly according to an embodiment.

FIG. 8 shows the conical mirror concentrator 10" bonded to a source cell 103 according to an embodiment. The bottom 103a of the source cell 103 may have a plate 9 or other surface configured as a location for the conical mirror concentrator 10" to be mounted. This may be accomplished with further anodic bonding at points 11c. Points 11c are actually a continuous circle which form a vacuum seal. Plate 9 may have a central opening or be transparent to permit light to pass. This forms a sub-assembly 150.

Figure 9:
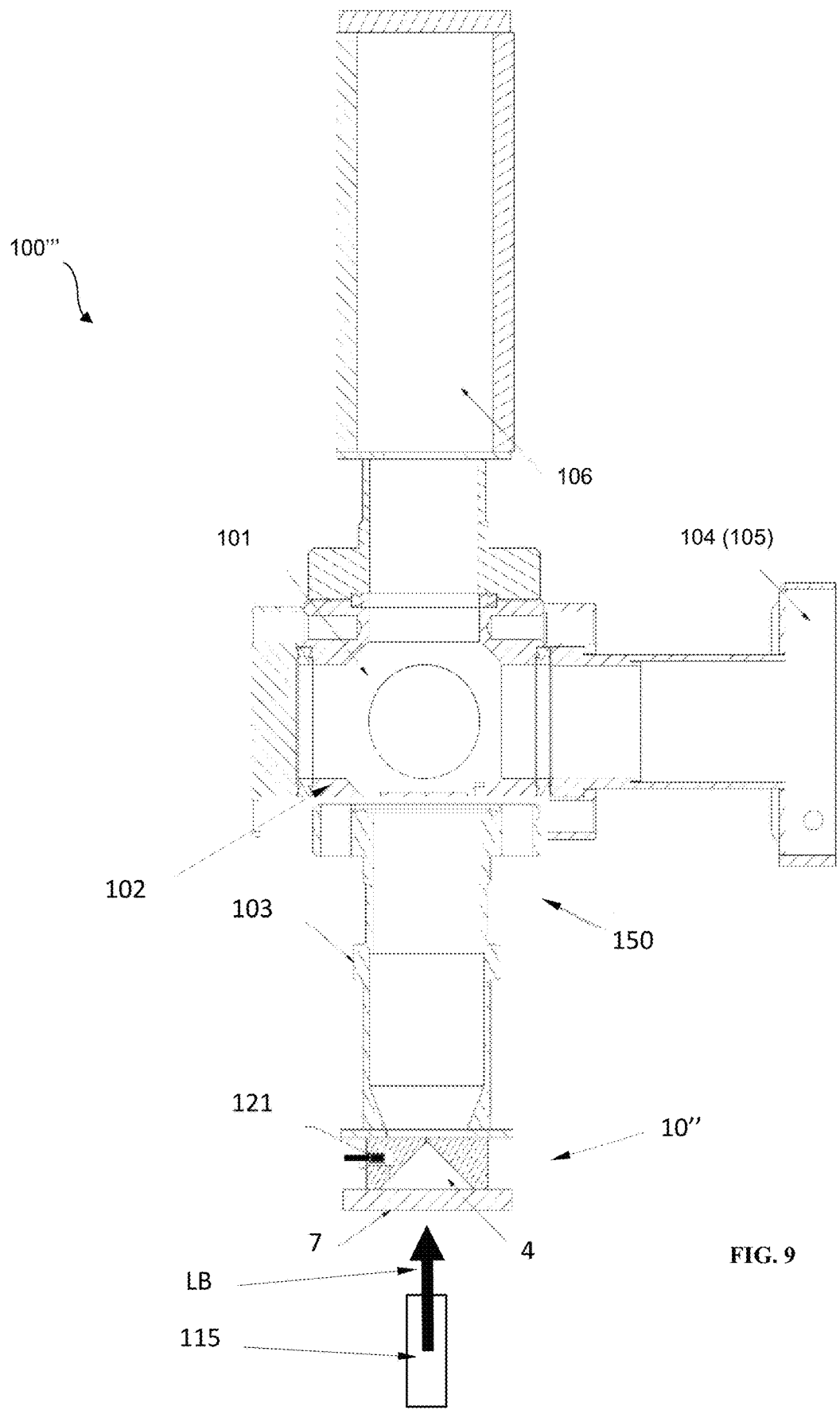
FIG. 9 shows a laser-cooled cold atom experimentation apparatus in which the sub-assembly of FIG. 8 is joined.

FIG. 9 shows the laser-cooled cold atom experimentation apparatus 100" in which the sub-assembly 150 can be joined to a mounting location 102 on a central mounting structure 101 of the laser-cooled cold atom experimentation apparatus 100 or 100' with ordinary fastening means, like bolts, compatible for vacuum sealed elements. Otherwise, the remaining elements and operation of apparatus 100" are similar to the apparatus 100' discussed above with respect to FIG. 5.

The aforementioned embodiments make the whole system much more compact, not just the vacuum system by integrating the conical mirror into the flange, but also by eliminating many optical elements that are necessary for a traditional laser-cooled beam source. It also make more efficient use of the laser power because of single laser beam replacing the traditional multi-beam systems. Accordingly, a method of replacing a laser cooled atom beam source in an existing laser cooled atom experimentation apparatus is also provided. It may include removing an existing laser cooled atom beam source comprised of multiple lasers for cooling source material from the existing laser cooled atom experimentation apparatus; and attaching the laser cooled atom beam source accordingly to embodiments of the present invention to the laser cooled atom experimentation apparatus in its place.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

We claim:

1. A conical mirror concentrator for a laser-cooled cold atom beam source comprising:
   a body;
   a reflective inner conical surface formed on the body tapering from a large diameter at a first side of the body inward to a smaller diameter in an interior space of the body, wherein the inner conical surface focuses light to an axis within the interior space of the body;
   a hole extending from the interior space of the body near a pinnacle of the inner conical surface to a second, opposite side of body; and
   means for mounting the concentrator to a vacuum chamber and providing a vacuum seal therebetween comprising: (i) a flange connected to the body, the flange being configured to readily deform around its circumference in conjunction with CF flange hardware to form the vacuum seal, or (ii) a glass plate anodicly bonded to the body.

2. The conical mirror concentrator of claim 1, wherein the flange extends from the outer circumference of the body.

3. The conical mirror concentrator of claim 1, wherein the flange has a standardized dimension corresponding to the CF flange hardware.

4. The conical mirror concentrator of claim 1, further comprising a wire or conductor which is incorporated in, extends through the flange, or both, and is configured to heat a pellet of source material attached to the wire or conductor and vaporize atoms thereof.

5. The conical mirror concentrator of claim 1, wherein the flange is formed of oxygen-free copper.

6. The conical mirror concentrator of claim 1, wherein the body and the flange are integrally formed together as a single piece.

7. The conical mirror concentrator of claim 1, wherein the inner conical surface is polished, coated to form a highly reflective surface, or both.

8. The conical mirror concentrator of claim 1, wherein the body is formed of silicon.

9. The conical mirror concentrator of claim 1, wherein the glass plate is transparent to light.

10. The conical mirror concentrator of claim 1, wherein the glass plate closes off and seals the front of the conical mirror concentrator.

11. The conical mirror concentrator of claim 1, wherein the glass plate connects to a mounting structure.

12. The conical mirror concentrator of claim 1, wherein the body comprising a sealed cavity for containing a pellet of source material, and a small passageway which connects the sealed cavity to the interior space of the body.

13. The conical mirror concentrator of claim 12, wherein the pellet of source material is attached to a wire or conductor which passes through a plate sealing the pellet within the cavity and is configured to heat the pellet of source material and vaporize atoms thereof.

14. A laser-cooled cold atom beam source for producing cooled atoms in a laser cooled atom experimentation apparatus comprising:
   the conical mirror concentrator according to claim 1 positioned in or connected to the vacuum chamber, the vacuum chamber having a wall at least a portion of which is transparent to laser light; and
   a single laser, positioned outside of the vacuum chamber, for providing a beam of light to the conical mirror concentrator.

15. The laser cooled atom beam source according to claim 14 further comprising: magnetic field coils arranged near the conical mirror concentrator.

16. A laser cooled cold atom experimentation apparatus comprising:
the laser cooled atom beam source according to claim 14 producing cooled atoms; and
a high-vacuum section configured to perform an experimentation using the cooled atoms.

17. A method of replacing a laser cooled atom beam source in an existing laser cooled atom experimentation apparatus, the method comprising:
removing an existing laser cooled atom beam source comprised of multiple lasers for cooling source material from the existing laser cooled atom experimentation apparatus; and
attaching the laser cooled atom beam source according to claim 14 to the laser cooled atom experimentation apparatus in its place.

18. The conical mirror concentrator of claim 1, wherein the flange is configured, with compression imparted with the CF flange hardware, to be pinched to form the vacuum seal around its circumference.

19. The conical mirror concentrator of claim 1, wherein the vacuum seal is configured to hold a vacuum with a pressure of $10^{-7}$ Torr or less.

20. The conical mirror concentrator of claim 1, wherein the glass plate is configured to engage with CF flange hardware.

21. The conical mirror concentrator of claim 1, wherein the hole is sized to form a beam of cold atoms as they pass from the first side of the body to the second side of the body.

22. The conical mirror concentrator of claim 1, wherein the hole has a length and diameter of 1 mm and 0.3 mm, respectively.

23. A conical mirror concentrator for a laser-cooled cold atom beam source comprising:
a body;
a reflective inner conical surface formed on the body tapering from a large diameter at a first side of the body inward to a smaller diameter in an interior space of the body, wherein the inner conical surface focuses light to an axis within the interior space of the body;
a hole extending from the interior space of the body near a pinnacle of the inner conical surface to a second, opposite side of body; and
a mounting flange extending from the outer circumference of the body,
wherein at least the flange is formed of oxygen-free copper.

24. A conical mirror concentrator for a laser-cooled cold atom beam source comprising:
a body;
a reflective inner conical surface formed on the body tapering from a large diameter at a first side of the body inward to a smaller diameter in an interior space of the body, wherein the inner conical surface focuses light to an axis within the interior space of the body;
a hole extending from the interior space of the body near a pinnacle of the inner conical surface to a second, opposite side of body; and
a plate anodicly bonded to the body.

\* \* \* \* \*